(12) United States Patent
Crimpita

(10) Patent No.: US 7,866,764 B2
(45) Date of Patent: Jan. 11, 2011

(54) HYDRAULIC CONTROL UNIT FOR AN ELECTRONICALLY CONTROLLED BRAKE SYSTEM

(75) Inventor: Adrian Crimpita, Sterling Heights, MI (US)

(73) Assignee: Continental Teves, Inc., Auburn Hills, MI (US)

( * ) Notice: Subject to any disclaimer, the term of this patent is extended or adjusted under 35 U.S.C. 154(b) by 618 days.

(21) Appl. No.: 11/544,683

(22) Filed: Oct. 6, 2006

(65) Prior Publication Data

US 2008/0084108 A1    Apr. 10, 2008

(51) Int. Cl.
*B60T 8/36* (2006.01)
(52) U.S. Cl. ......... 303/119.3; 303/116.4; 303/DIG. 11; 303/DIG. 10
(58) Field of Classification Search .............. 303/116.4, 303/119.3, 89, DIG. 10, DIG. 11
See application file for complete search history.

(56) References Cited

U.S. PATENT DOCUMENTS

| 6,142,751 | A  | * | 11/2000 | Krauter et al. | ............... 417/415 |
| 7,118,183 | B2 | * | 10/2006 | Hinz et al. | ............... 303/119.3 |
| 7,121,635 | B2 | * | 10/2006 | Kondo | .................... 303/119.3 |

* cited by examiner

*Primary Examiner*—Bradley T King

(57) ABSTRACT

A hydraulic control unit of an electronically controlled hydraulic brake system has a housing (49) accommodating a pump (35) and at least one low-pressure accumulator. The low-pressure accumulator is positioned in a location at a lower height than the cam cavity (51) of the pump (35), and a drainage bore (53) connects the cam cavity (51) with the spring chamber (68) of at least one of the low-pressure accumulators. This allows the drainage of brake fluid from the cam cavity (51) into the spring chamber (68) solely by way of gravity. Thus this measure eliminates the risk of damage to the pump motor in the event that ambient water penetrates the cam cavity (51), which might flush brake fluid from the cam cavity 51 into the housing (49) of the pump motor.

3 Claims, 3 Drawing Sheets

US 7,866,764 B2

HYDRAULIC CONTROL UNIT FOR AN ELECTRONICALLY CONTROLLED BRAKE SYSTEM

BACKGROUND OF THE INVENTION

The present invention relates to a hydraulic control unit of an electronically controlled hydraulic brake system capable of performing functions like anti-lock control, traction control or electronic stability control. Such brake systems include a plurality of valves for modulating the hydraulic brake pressure in the wheel brakes. Brake fluid relieved from the wheel brakes during an anti-lock braking operation is collected in at least one low-pressure accumulator, from where it is returned into the brake line by means of at least one hydraulic pump.

Usually, each one of two brake circuits includes one low-pressure accumulator and one pump, wherein the two pumps of the two separate brake circuits are jointly driven by one electric motor. The motor drives a rotating cam arranged between two radial pump pistons, one for each brake circuit. The pump pistons are pushed outward by the rotating cam in an alternating order and are returned either by spring force or by fluid pressure prevailing on the other side of the respective piston.

The hydraulic control unit generally comprises a machined housing accommodating the cam shaft and the pump pistons, wherein the cam shaft extends to the outside of the housing where the motor is attached. The housing also includes recesses for the low-pressure accumulators. Each low-pressure accumulator has an accumulator chamber separated from a spring chamber by means of an accumulator piston which is biased toward the accumulator chamber by a compression spring. The accumulator chamber is located toward the interior the housing so that the spring, which abuts an accumulator cap closing of the low-pressure accumulator of toward the atmosphere, urges the accumulator piston toward the interior of the housing.

Due to the movement of the pistons, a pump may experience minor leakage of brake fluid. This leaked brake fluid can usually seep past the pistons back into the brake system once the brake operation is finished and the fluid pressure on the pressure side of the pistons becomes equal to atmospheric pressure.

However, if a vehicle is designed to be an amphibian or submersible vehicle, the brake system is surrounded by water. This penetrating water can then flush the leaked brake fluid into the housing of the electric motor. Brake fluid is highly corrosive an may damage the electric motor.

It is therefore the objective of the present invention to provide a hydraulic control unit which is suited for a submersible vehicle.

Another objective of the present invention is to provide a low-cost solution for the problem.

SUMMARY OF THE INVENTION

These objectives are achieved by a hydraulic control unit of the above-mentioned kind including at least one low-pressure accumulator, which is positioned in a location at a lower height than the cam shaft cavity, wherein a drainage bore connects the cam shaft cavity with the spring chamber of at least one of the low-pressure accumulators.

DETAILED DESCRIPTION OF THE DRAWINGS

Figure 1:
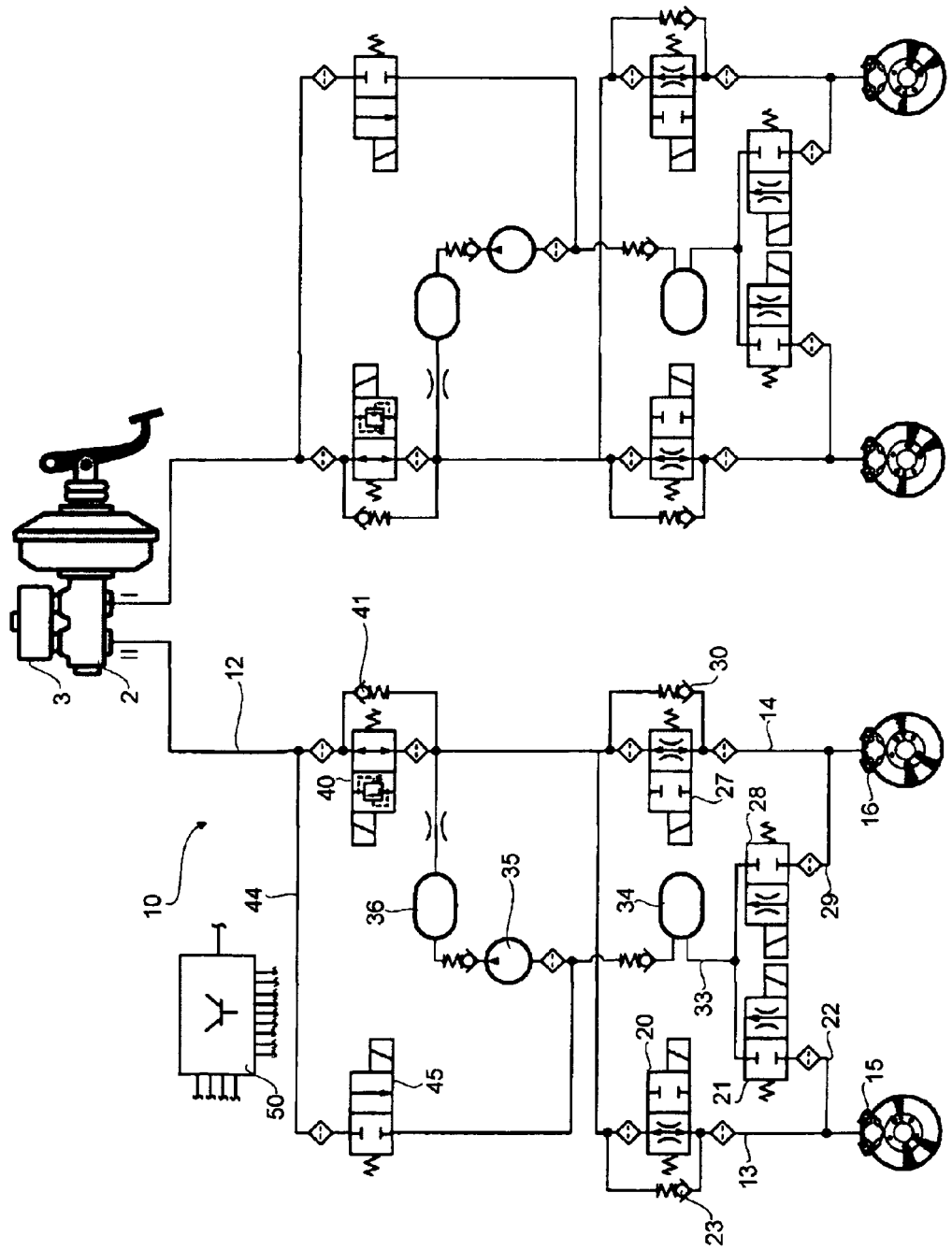
FIG. 1 shows the schematic set-up of a hydraulic brake system in which the present invention can be implemented.

FIG. 1 shows a hydraulic dual-circuit brake system 10 for motor vehicles capable of performing anti-lock brake control as well as active interventions for traction control, ESC, ARP, and the like. The brake system has a pedal-actuated tandem master brake cylinder 2 with a brake fluid reservoir 3.

Both brake circuits of the shown brake system have the same set-up. Thus the following description of brake circuit II applies to brake circuit I as well.

The brake line 12 of brake circuit II begins at the master brake cylinder 2 and splits into two inlet lines 13 and 14. Inlet line 13 leads to a wheel brake 15 and inlet line 14 leads to a wheel brake 16 of a driven axle of the vehicle.

A valve assembly that comprises an inlet valve 20 disposed in the inlet line 13 and a outlet valve 21 that is located in a return line 22 is associated with the wheel brake 15. A one-way valve 23 is disposed parallel to the inlet valve 20 in the inlet line 13. The inlet valve 20 has a spring-actuated open position and an electromagnetically switchable blocking position. The outlet valve 21 has a spring-actuated blocking position and an electromagnetically switchable open position The two-position valves 20 and 21 of the valve assembly also serve the purpose of brake pressure modulation; in switching positions, pressure build-up, holding, and reduction in wheel brake 15 are possible.

A valve assembly is likewise associated with the wheel brake 16 and in the same way as the valve assembly associated with wheel brake 15 comprises an inlet valve 27 in the inlet line 14 and a outlet valve 28 in a return line 29. A one-way valve 30 is connected parallel to the inlet valve 27 in the inlet line 14. The two-position valves 27 and 28 of the valve assembly 26 again have the purpose of modulating the pressure in the wheel brake 16.

The return lines 22 and 29 originating at the inlet lines 13 and 14 between the two-position valves 20 and 27 and the wheel brakes 15 and 16 are united in a return line 33 that is connected to the brake line 12. A low-pressure accumulator 34 communicates with the return line 33. Essentially disposed downstream of the low-pressure accumulator 34 in the return line 33 are a pump 35, a damper chamber 36 and a bypassable throttle. The pump 35, which is embodied as self-aspirating, can be likewise be driven by the drive motor (not shown).

A shut-off valve 40 with a parallel-connected one-way bypass valve 41 is disposed in the brake line 12 between the master brake cylinder 2 and the connection of the return line 33. The shut-off valve 40 has a spring-actuated open position and an electromagnetically switchable blocking position. In its blocking position, the shut-off valve 40 includes a pressure limiting function, which prevents excessive pressure build-up in the brake line below the shut-off valve 40.

A bypass line 44 begins at the brake line 12 between the master brake cylinder 2 and the shut-off valve 40. Disposed in the bypass line 44 is a switch-over valve 45 having one spring-actuated closed position and one electromagnetically switchable open position. The bypass line 44 is connected to the return line 33 between the inlet side of the self-priming pump 35 and the low-pressure accumulator 34.

The brake system 10 includes an electronic control unit 50, which can evaluate signals from various sensors (not shown) that monitor the rotational behavior of the vehicle. The control unit 50 controls the pump 35 and valves 20, 21, 27, 28, 40, 45 in accordance with a situation-specific control algorithm.

The mode of operation of the brake system is well known and will not be described in close detail in this context.

While the brake system shown is capable of performing so-called active brake interventions, i.e. of building up brake pressure independent of the driver's operation of the brake pedal, such a capability is not required for the present invention. The invention can be implemented just as well in a simple anti-lock brake system comprising at least a pump and a low-pressure accumulator arranged in a way that the low-pressure accumulator is positioned lower than the pump.

Figure 2:
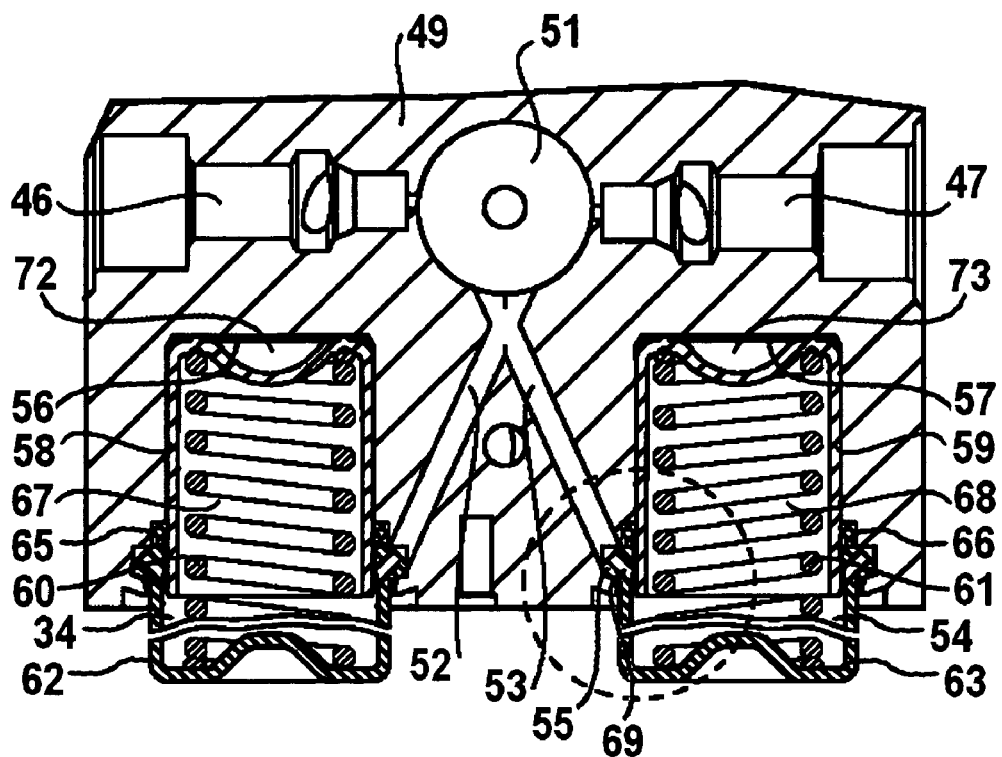
FIG. 2 shows a portion of a hydraulic control unit where the present invention is implemented.

Such an arrangement is shown in FIG. 2. Depicted is a portion of a cross-section of a partially assembled hydraulic control unit of an electronically controlled hydraulic brake system, e.g. in a brake system described above.

The housing 49 accommodates a cavity 51 for a rotating cam (not shown). Adjacent to the cam cavity 51 and radially extending therefrom are two bores 46 and 47 for hydraulic pumps (not shown), for instance like pump 35, driven by the cam. In a completely assembled unit, a motor driving the cam shaft will be arranged in front of or behind the image plane.

Beneath the pump bores 46 and 47, the housing 49 includes two generally cylindrical recesses 56 and 57, each of them partially accommodating one of two low-pressure accumulators 34 and 54. Each of the low-pressure accumulators 34 and 64 has a piston 58 and 59, respectively, made of sheet metal. These pistons 58 and 59 divide the interior spaces of the low-pressure accumulators into an accumulator chamber 72 and 73, respectively, and a spring chamber 67 and 68, respectively. The accumulator chambers 72 and 73 serve to collect brake fluid released from the wheel brakes during a brake pressure reduction. The spring chambers 67 and 68 are each closed off against the outside by means of essentially pot-shaped caps 62 and 63, respectively. These caps 62 and 63 protrude in reality farther to the outside than shown in the picture, which is indicated by the break in the illustration. In each spring chamber 67 and 68, a compression spring 60 or 61, respectively, abuts the cap 62/63 on one end and the piston 58/59 on its other end, thus urging the piston toward the accumulator chamber 72/73. A sealing ring 65/66 is arranged in each accumulator recess around the piston 58/59 to seal off the accumulator chamber 72/73 against the spring chamber 67/68.

According to the invention, the cam cavity 51 is provided with two drainage bores 52 and 53, each of them leading from the lowest point of the cam cavity 51 to one of the spring chambers 67 and 68 of the low-pressure accumulators 34 and 54.

If, according to prior art, brake fluid leaks from either of the pump bores 46 and 47 into a closed-bottom cam cavity, penetrating ambient water may flush the brake fluid into the attached motor housing. Since brake fluid is highly corrosive, the motor can easily be damaged by such an incident.

According to the present invention, the drainage bores 52 and 53 take advantage of gravity by allowing such leaked brake fluid to run down from the lowest point of the cam cavity 51 along the drainage bores 52 and 53 into the spring chambers 67 and 68 of the low-pressure accumulators 34 and 54.

It would be possible to eliminate one of these drainage bores if the amount of leakage of brake fluid from the pump bores 46 and 47 to the cam cavity 51 is only minor so that one spring chamber could accommodate the fluid without compromising the accumulator function.

Figure 3:
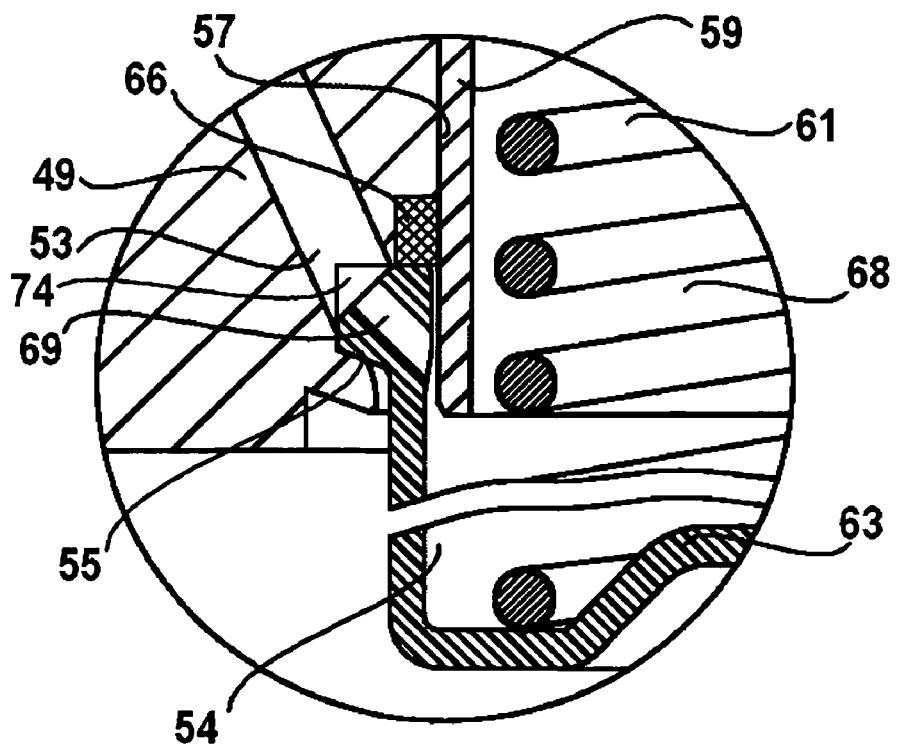
FIG. 3 shows an enlarged view of a portion of FIG. 2.

The portion indicated by a dashed circle is shown in closer detail in FIG. 3.

As can be gathered from FIG. 3, the accumulator cap 63 comprises a thickened rim 55, which is provided with at least one passage bore 69. In order to make the drainage function independent of the position of a sole passage bore 69, preferably a plurality of such bores is arranged around the perimeter of the accumulator cap 63. The drainage bore 53 opens into an annular ring chamber 74 adjacent to the sealing ring 66 on the side of the spring chamber 68. The rim 55 of the accumulator cap 63, which is inserted into the ring chamber 74 and secured by calking, is tapered off along its upper outside edge so that the ring chamber 74 provides a continuous connection of the drainage bore 53 to all passage bores 74 and thus to the spring chamber 68.

Figure 4:
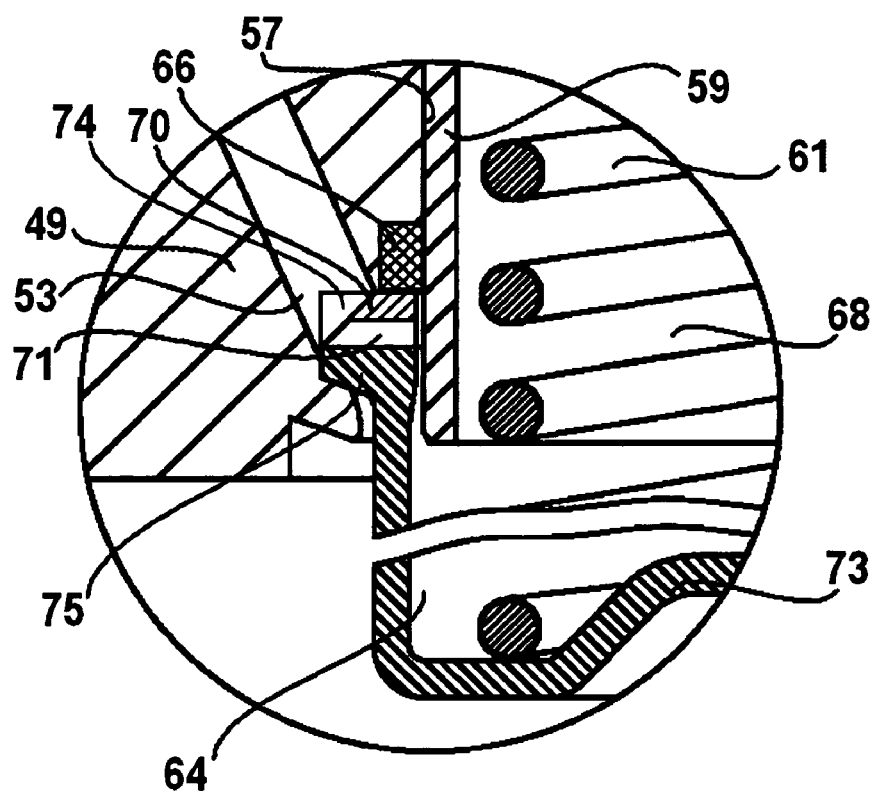
FIG. 4 shows an enlarged view of an alternate embodiment which may replace the arrangement of FIG. 3.

And alternative to the arrangement illustrated in FIGS. 2 and 3 is shown in FIG. 4. In FIG. 2, FIG. 4 replaces the portion indicated by the dashed circle. Identical elements carry identical reference numerals.

Figure 5A:
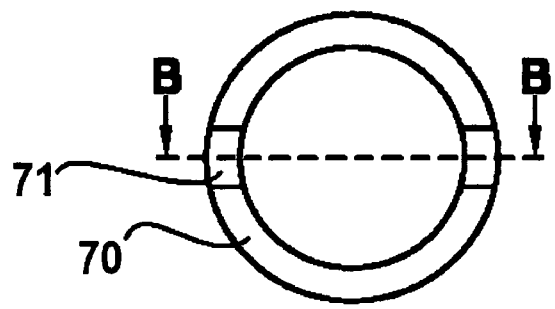
FIGS. 5A and 5B show two different views of a washer element used in the embodiment of FIG. 4
Figure 5B:
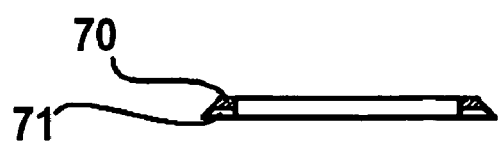

The difference between FIGS. 3 and 4 lies in the way the connection between the ring chamber 74 and the spring chamber 68 is established. Instead of providing the rim of the accumulator cap with machined bores, The rim 75 of the accumulator cap 73 is axially flattened and a washer 70 is inserted between the rim 75 and the sealing ring 66. The washer 70, individually shown in FIGS. 5A and 5B, has a tapered upper outside edge just like the rim 55 in FIG. 3. Instead of drilled passage bores, radially extending axial passage recesses 71 are provided in the bottom surface of the washer 70 in order to connect the ring chamber 70 with the spring chamber 68.

The recesses 71 in washer 70 in the form of indentations are easier and cheaper to manufacture than the drilled passage bores 74 in FIG. 3.

While only two specific embodiments were described in detail, it is clear that there are many ways to establish a connection for draining brake fluid from a cavity into the spring chamber of a low-pressure accumulator by taking advantage of gravity.

What is claimed is:

1. A hydraulic control unit for an automotive brake system with a housing (49) containing a cavity (51) for a cam shaft of a hydraulic pump (35) and a low-pressure accumulator (54), which is at least in part accommodated in the housing (49) and positioned in a location at a lower height than the cam cavity (51), the low-pressure accumulator (54) having an interior space with an accumulator piston (59) dividing the interior space into an accumulator chamber (73) and a spring chamber (68), the piston (59) being biased toward the accumulator chamber (73) by means of a spring (61) arranged in the spring chamber (68), wherein a drainage bore (53) connects the cam cavity (51) with the spring chamber (68) and the spring chamber (68) of the low-pressure accumulator (54) is closed off against the ambience by means of a steel cap (63) attached to the housing (49) and wherein the steel cap (63) comprises a radially extending peripheral rim (55) located inside the housing (49), the radially extending peripheral rim (55) comprising at least one perforation (74) establishing a hydraulic connection between the drainage bore (53) and the spring chamber (68).

2. The hydraulic control unit according to claim 1, wherein the drainage bore (53) connects the lowest point of the cam cavity (51) with the spring chamber (68).

3. A hydraulic control unit for an automotive brake system with a housing (49) containing a cavity (51) for a cam shaft of a hydraulic pump (35) and a low-pressure accumulator (54), which is at least in part accommodated in the housing (49) and positioned in a location at a lower height than the cam cavity (51), the low-pressure accumulator (54) having an interior space with an accumulator piston (59) dividing the interior space into an accumulator chamber (73) and a spring chamber (68), the piston (59) being biased toward the accumulator chamber (73) by means of a spring (61) arranged in the spring chamber (68), wherein a drainage bore (53) connects the cam cavity (51) with the spring chamber (68) and the spring chamber (68) of the low-pressure accumulator (54) is closed off against the ambience by means of a steel cap (63) attached to the housing (49) and wherein the steel cap (63) comprises a radially extending peripheral rim (75) located inside the housing (49), a washer (70) adjacent to the radially extending peripheral rim (75) is provided with at least one radial recess (71) which establishes a hydraulic connection between the drainage bore (53) and the spring chamber (68).

* * * * *